Figure 1:
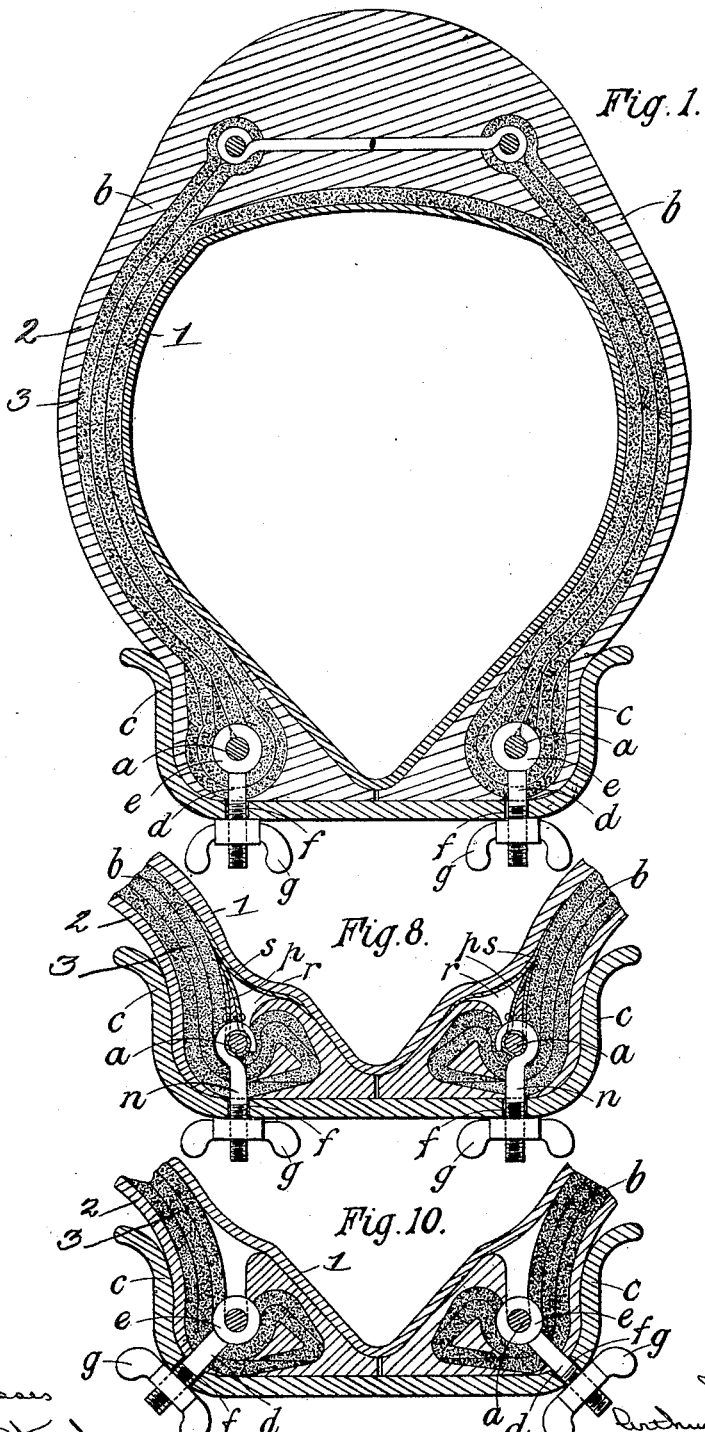

No. 681,619. Patented Aug. 27, 1901.
A. T. COLLIER.
MEANS FOR SECURING TIRES TO WHEELS OF ROAD VEHICLES.
(Application filed Jan. 2, 1901.)
(No Model.) 2 Sheets—Sheet 1.

No. 681,619. Patented Aug. 27, 1901.
A. T. COLLIER.
MEANS FOR SECURING TIRES TO WHEELS OF ROAD VEHICLES.
(Application filed Jan. 2, 1901.)
(No Model.) 2 Sheets—Sheet 2.
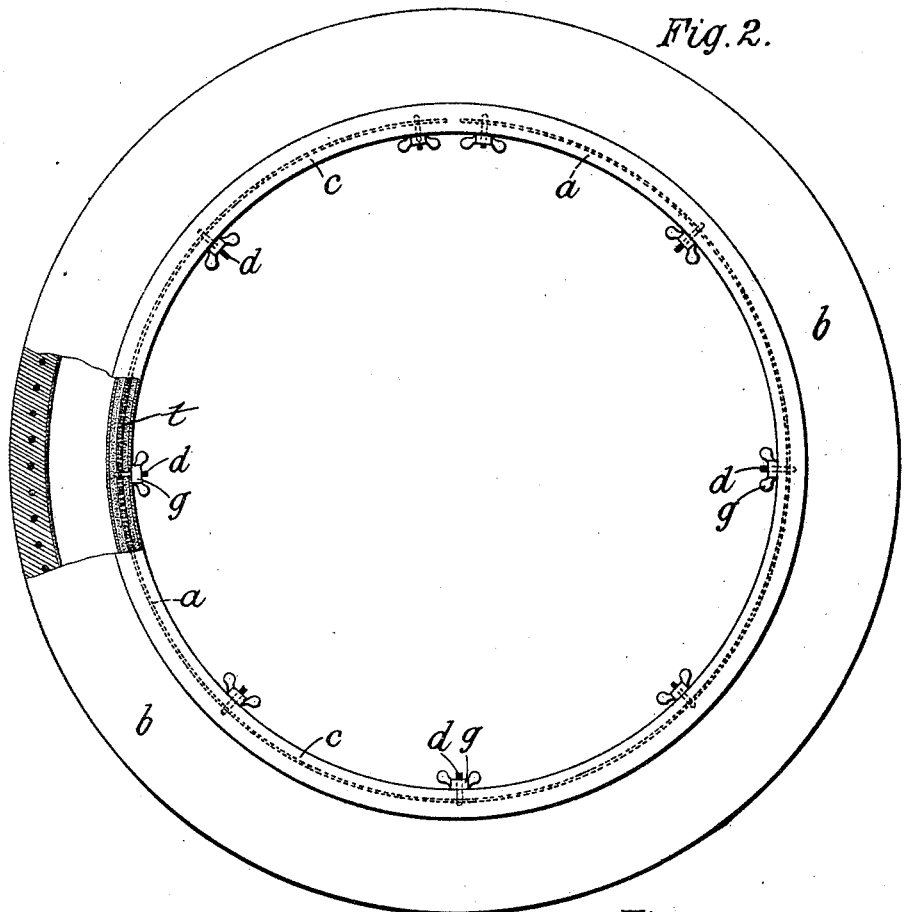
Fig. 2.
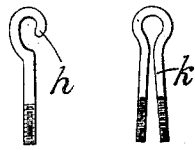
Fig. 4. Fig. 5.
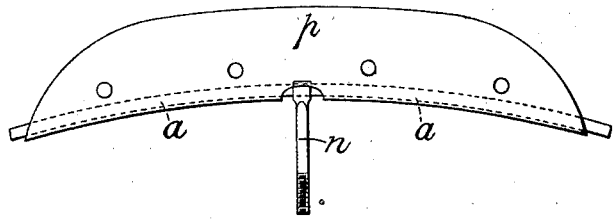
Fig. 7.
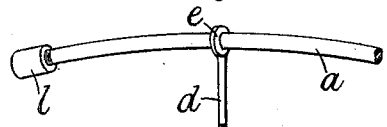
Fig. 3.
Fig. 6.
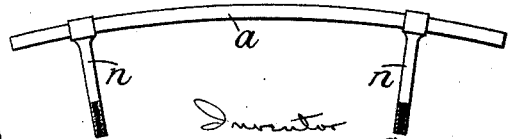
Fig. 9.
Witnesses
Inventor
Arthur T. Collier
by James L. Norris
atty
THE NORRIS PETERS CO., PHOTO-LITHO., WASHINGTON, D. C.

UNITED STATES PATENT OFFICE.

ARTHUR THOMAS COLLIER, OF ST. ALBANS, ENGLAND, ASSIGNOR OF ONE-HALF TO EDGAR OLIVER GOSS, OF LONDON, ENGLAND.

MEANS FOR SECURING TIRES TO WHEELS OF ROAD-VEHICLES.

SPECIFICATION forming part of Letters Patent No. 681,619, dated August 27, 1901.

Application filed January 2, 1901. Serial No. 41,838. (No model.)

*To all whom it may concern:*

Be it known that I, ARTHUR THOMAS COLLIER, a subject of the Queen of Great Britain, residing at St. Albans, England, have invented certain new and useful Improvements in Means for Securing Tires to the Wheels of Road-Vehicles, of which the following is a specification.

This invention relates to improved means for securing elastic tires to the wheels of road-vehicles, and is more especially intended for use in connection with motor-cars and other heavy road-vehicles.

My said invention relates to that class of fastening in which bolts attached to the tire are passed through holes in the rim and are secured by screw-nuts on the exterior; and my improved fastening comprises the improved combinations hereinafter described, and specified in the claims.

Referring to the accompanying drawings, Figure 1 is a transverse section of a tire, illustrating my improved method of fastening. Fig. 2 is a side elevation, partly in section, of the tire and wheel-rim, drawn to a smaller scale. Fig. 3 is a detail view of a portion of the retaining-wire with a ring-bolt threaded thereon. Figs. 4 and 5 illustrate modified forms of securing-bolts. Fig. 6 shows one form of wire which I employ. Fig. 7 is a side elevation, and Fig. 8 a transverse section, illustrating a modification of my improved fastening. Figs. 9 and 10 illustrate modifications hereinafter described.

Like characters of reference denote corresponding parts in the several figures.

The retaining wires or cores $a\ a$ in the edges of the tire $b$ are fastened to the rim $c$ by means of bolts $d$, furnished with perforated heads $e$, through which the wires $a\ a$ are threaded. The said bolts $d$ pass through slits in the edges of the tire and through holes $f$ in the rim and are secured by nuts $g$, screwed on the bolts. The wires $a$, which have about the same length as the circumference of the tire-seat, are not endless, but are divided, as indicated in Fig. 2. In this manner the same are rendered expansible. Any desired number of bolts $d$ may be used for securing the tire, the same being suitably spaced around the rim.

The tire $b$ comprises an inner inflatable tube 1 and an outer cover 2, the said cover having arranged in the walls thereof the canvases 3, which extend down to, are folded back upon themselves, and form in the edges of said cover channels for the reception of the retaining-cores $a$. By reason of the wires or cores being discontinuous the tire can be placed on or removed from the wheel, the edges of the tire-cover stretching and the wires opening at their free ends to allow the tire to pass over the edges of the rim; but on screwing up the nuts the tire is drawn closely down into the rim and is equally secure whether the tire is inflated or deflated. This is especially advantageous in a motor-tire, wherein the air-tube is very liable to be nipped and ruptured by being caught between the edge of the tire and the bottom of the rim.

I sometimes use hooks $h$, Fig. 4, having screw-threaded shanks, or a securing device $k$, Fig. 5, somewhat resembling a split pin and screw-threaded on the shank portion, in lieu of the ring-bolts shown in Fig. 3.

In lieu of a single core or wire in each edge of the tire I sometimes employ a number of short lengths of wire each extending only partially around the tire. Each section of wire is fastened by a bolt or two or more bolts.

In some instances in order to prevent the withdrawal of the wires or cores from the bolts or fastening devices after the latter are threaded thereon, either by "creeping" of the wire or by accident arising during manipulation of the tire or when the tire is being placed on the wheel or being removed therefrom, small heads may be formed on the ends of the wires. This can be conveniently accomplished either by riveting the ends of the wires or by providing the ends of the wires with screw-threads and screwing nuts thereon, as indicated at $l$, Fig. 3. The same result may be accomplished by securing the wire to one of the ring-bolts, preferably to the one diametrically opposite to the ends of the said wire at each side of the tire. The wires are preferably notched, as shown at $m$, Fig. 6, to engage with correspondingly-notched eyes of the bolt-heads to increase the hold of the bolts on the wires.

As a modification I sometimes use, in lieu of plain wires and detachable bolts, lengths of wire having screw-threaded shanks n integrally formed therewith, as indicated in Figs. 7, 8, and 9. In the arrangement shown in Figs. 7 and 8 the wires a are provided with upwardly-extending stiffening plates or webs p, and thus act as a series of beams or girders to hold the tire down into the rim. These plates preferably rest in recesses r, formed in the edge of the tire, and are covered by flaps s, Fig. 8, of suitable buffing material, such as canvas, leather, or the like. They can also, if desired, by riveting or otherwise, be suitably secured to the edges of the tire.

The method of fastening shown in Figs. 1 to 3 can be also applied to tires having edges such as are shown in Fig. 8. This arrangement is illustrated in Fig. 10, wherein the holes for the screw-threaded bolts are formed in the angles of the rim, thus facilitating the insertion of the bolts into the said holes in securing the tire in position.

What I claim is—

1. The combination of an inner inflatable tube, an outer cover, canvases arranged in the walls of said cover, and folded so as to form a channel in each edge of the cover, expansible notched retaining-cores inclosed in said channels and free to slide therein, a rim, bolts engaging said cores and passing through the rim, and fastening-nuts on said bolts.

2. The combination of an inner inflatable tube, an outer cover, layers of fabric arranged in the walls of said cover and folded so as to form a channel in each edge of the cover, expansible retaining-cores inclosed in said channels and free to slide therein, a rim, bolts engaging said cores and passing through the rim, and fastening-nuts on said bolts, substantially as described.

3. The combination of the rim of a vehicle-wheel, a pneumatic tire, channels in the edges of said tire, retaining-cores in said channels, bolts threaded on said cores and passing through holes in the rim, fastening-nuts on said bolts, and teeth or serrations on said cores, substantially as, and for the purpose, hereinbefore, described.

4. The combination, with the rim of a vehicle-wheel, of a pneumatic tire, channels in the edges of said tire, retaining-cores in said channels, stiffening plates or webs on said cores, flaps covering said stiffening plates or webs, bolts engaging said cores and passing through holes in the rim, and fastening-nuts on said bolts, substantially as described.

In witness whereof I have hereunto set my hand in presence of two witnesses.

ARTHUR THOMAS COLLIER.

Witnesses:
JOHN T. KNOWLES,
H. ARTHUR BEESTON.